United States Patent

[11] 3,625,341

[72] Inventors Heinz Kretzschmar
 Wiesensteig;
 Werner Wallberg, Ludwigsburg, both of
 Germany
[21] Appl. No. 53,385
[22] Filed July 9, 1970
[45] Patented Dec. 7, 1971
[73] Assignee Organisation Rolfs K.G.
 Wiesensteig (Wurttenburg), Germany
[32] Priority Feb. 17, 1970
[33] Germany
[31] P 20 07 166.3

[54] BELT CONVEYORS
 10 Claims, 3 Drawing Figs.
[52] U.S. Cl. ..................................... 198/109,
 198/184, 198/204
[51] Int. Cl. ..................................... B65g 15/60,
 B65g 41/00

[50] Field of Search ........................................... 198/109,
 184, 204

[56] References Cited
 UNITED STATES PATENTS
 2,990,938 7/1961 Sheehan ..................... 198/109 X

*Primary Examiner*—Edward A. Sroka
*Attorneys*—Richard Low and Murray Schaffer

ABSTRACT: In a belt conveyor an assembly comprising at least two sections similarly constructed. Each of the sections comprises a frame, having a plurality of rollers journaled thereon for supporting a belt. The sections are adjustably secured in tandem along a defined radius of curvature and are provided with connecting rollers between adjacent sections. The connecting rollers being journaled beneath the supporting rollers, and being themselves pivotably mounted mounted to the connecting means to permit the training of the belt in a continuous path from one section to another.

PATENTED DEC 7 1971 3,625,341
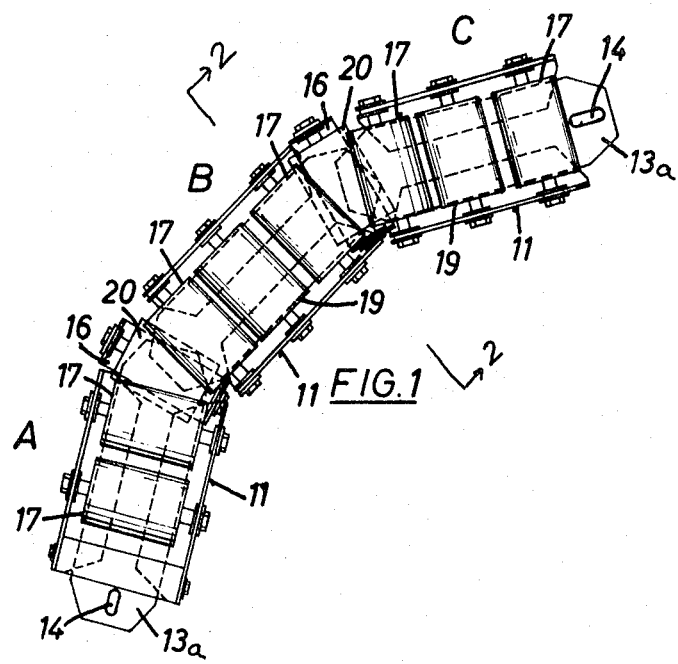
FIG.1
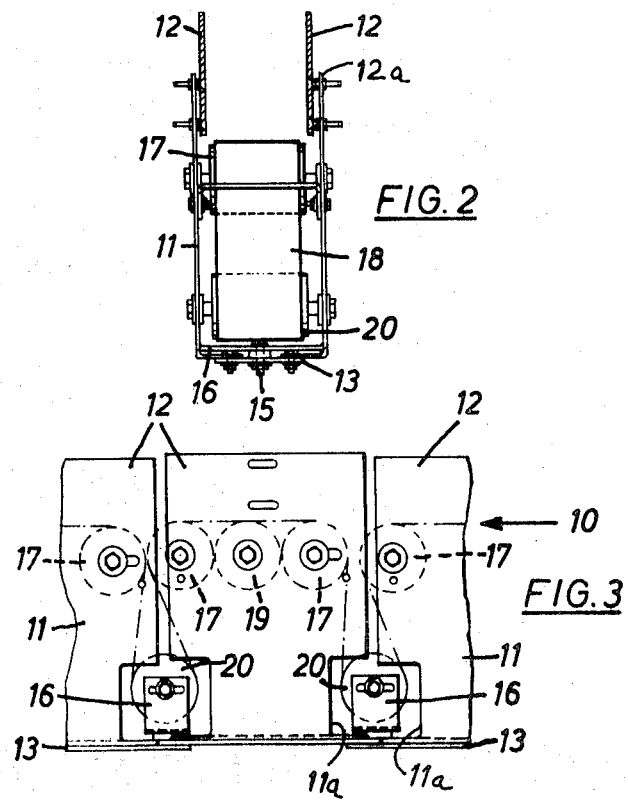
FIG.2
FIG.3
INVENTORS.
HEINZ KRETZSCMAR
WERNER WALLBERG
BY

BELT CONVEYORS

BACKGROUND OF INVENTION

The present invention relates to endless belt conveyors and the like and in particular to cornering and turnoff devices therefor.

Continuous belt conveyors are commonly formed by entraining the carrier belt over a plurality of spaced parallel rollers so as to form an upper run or base on which the article to be transported may freely stand and be frictionally carried along. Lateral spaced walls are usually provided to guide the articles, forming a channel with the belt preventing the articles from falling from the belt. Corners and curved stretches are generally provided by preformed and preshaped sections employing offset rollers which are adapted to engage and guide the articles and cause them to turn out of the normally straight path. The devices are manufactured individually for each angle or radius of turn and are generally not adaptable to adjustment or variation. Furthermore, the preformed sections have lateral guides which must be predimensioned and preshaped to accommodate specific articles with the radius of curvature. The lateral space between the guides is not adjustable either to accommodate a change in conveyor path radius or a change in the size of the article.

Still another drawback concerns the entraining and mounting of the carrier belt within the curved section. Often in conventional constructions, the carrier belt is not carried around the corner or turnoff and the articles are moved only on the rollers. When the belt is turned around the corner special mechanisms must be provided to keep it from kinking or binding.

It is the object of the present invention to provide improved conveyor apparatus overcoming the drawback of the prior art.

It is another object of the present invention to provide improved cornering or turnoff mechanism for continuous belt conveyors, which may be universally adaptable to varying radii of curvature.

It is still another object of the present invention to provide improved means for cornering a continuous belt in belt conveyors.

These and other objects will be set forth in greater detail hereinafter.

SUMMARY OF THE INVENTION

According to the present invention continuous belt conveyors are provided with cornering assembly comprising a plurality of individual sections each having connecting means for laterally adjusting their relative positions parallel to the planes of transportation. Each section is provided with guide rollers for locating and supporting a continuous belt. A connecting roller is located, offset below the plane of transportation between each of the facing rollers of adjacent sections to train the belt across the space between each section.

Full details of the present invention are set forth in the following description.

BRIEF DESCRIPTION OF THE DRAWINGS

In the following, reference is made to the accompanying drawings in which:

FIG. 1 is a top plane view of a cornering mechanism of a conveyor made in accordance with the present invention;

FIG. 2 is a sectional view along line 2—2; and

FIG. 3 is a fragmentary side elevational view of the assembly shown in FIG. 1.

DESCRIPTION OF INVENTION

Turning to FIG. 1 there is seen a curved or corner assembly formed in accordance with the present invention, which is adapted to be interposed or joined between two straight stretches of a conveyor system, or even between other corner or curbed sections. As seen the curved stretch or assembly comprises a plurality of individual sections, here shown as three in numbers A, B and C. The exact number of sections is determined by factors such as the radius of curvature, the length of the corner and the length of each of the sections themselves.

The individual sections A, B and C are connected, in tandem, with each other and with the adjoining straight sections parallel to the plane of transportation 10 as seen in FIG. 3. Each of the sections A, B or C comprises a U-shaped channel frame 11 to the arms of which there is connected wall extensions 12 fastened by screw fasteners 12a. As seen in the illustrated embodiment, the channel frame 11 is formed of a pair of right-angle pieces which are joined at their bottom legs by a web member 13. The web member 13 projects from both ends of the frame 11 to form extending connecting plates 13a. Each plate 13a has an elongated slot 14 through which a bolt 15 or other pivot-fastening member may be fit. The slot 14 and bolt 15 are dimensioned to provide a degree of adjustment both longitudinally and angularly between each of the frame sections.

The bolt 15 serves to mount a U-shaped bearing bracket 16 having upstanding arms in which the axle or shaft of a roller 20 is secured. The lower end portions of the frame 11 are cut out at 11a to accommodate the bearing bracket. Consequently the bearing bracket 16 and the roller 20 are located between adjacent ones of sections A, B or C and directly above the pivot position defined by the bolt 15. The position of the bearing bracket 16 is thus also adjustably positionable as is the bolt 15.

The connecting roller 20 is thus pivotable about the center of the bearing bracket 16 within a plane parallel to the plane of transport so that it can assume any desired angular position between the vertical planes intersecting the axes of the rollers 17 of adjacent facing sections.

Mounted within each of the sections A, B and C, adjacent to the upper edge thereof, are a pair of parallel guide rollers 17. The rollers 17 straddle the frame 11, being notably journaled at both its ends to support a conveyor belt 18 tangentially along their upper edges in the plane of transportation 10. As seen in FIG. 3 the conveyor belt 18 is fed in a continuous path over guide rollers 17 of one section, then downwardly beneath the connecting roller 20 and thence upwardly over the rollers 17 of the adjacent section. Supporting rollers 19 may be interposed between the rollers 17 to maintain the belt 18 coplanar with the plane of transportation 10. The spacing of the rollers 17 and 19 and their actual number will of course depend upon their size and the length of each section. While rollers 17 are referred to as guide rollers and rollers 19 as supporting rollers, both function to support the belt 18 and the articles resting thereon. The guide rollers "guide" the belt in the plane of transport 10, hence their name.

The guide rollers 17, the supporting rollers 19 and the connecting rollers 20 are preferably freely rotatable, the belt being normally driven thereover by motive means (not shown) associated with the remainder of the conveyor system. On the other hand, any of the rollers 17, 19 and 20 may be positively driven by direct connection to a motor or other drive means, in a well known manner. The width of the frame 11 and thus the length of rollers 17, 19 and 20 are preferably adapted to the size of the article to be transported. It is most preferred that the rollers be of a length at least equal to the thickness or width of the articles. The rollers may be made of steel, plastic or similar material and may if desired be covered with a material having good frictional properties.

It is preferred that the roller 17 at one edge of each of the sections A, B or C, extends outwardly longitudinal beyond the vertical edge of the frame 11 while the roller 17 at the opposite end extends inwardly from the opposite vertical edge. As seen in FIG. 3 this provides a dovetailing of the roller of one section within the frame 11 of its next adjacent section. Thus, the edges of the frame 11 and of the side walls 12 are not coextensive or coterminous with the guide rollers 17 or the space between them. As a result the articles will avoid hanging up or becoming stuck between adjacent sections.

The center of the bearing bracket 16 is located in the perpendicular plane which bisects the angle made by the longitudinal extension of the median axial planes of the facing guide rollers 17 in adjacent sections. In this manner the bearing bracket 16 can be adjusted on pivot bolt 15 to permit the conveyor belt 18 to be trained thereover without kinking or binding. Further as will be seen in FIG. 3 the connecting roller 20 is partially beneath the longitudinally extending guide roller 17 of connected section. Since the lateral positions of the adjacent sections may be adjusted within the extent of the slot 14 the distances between sections and facing rollers may be varied as desired.

From the foregoing description it will be clear that an improved corner or turning assembly is provided in which a continuous belt may be mounted, and in which the lateral spacing, angular arrangement and radius of curvature may be easily adjusted. The present construction permits the use of a single continuous belt conveyor throughout the entire conveyor system, avoids the need for preshaped and preformed roller corners and turning devices.

With this construction, the radius of curvature of the corner may be varied by adjusting the angle between adjacent sections so that even S-shaped curves may be made. Two parallel offset conveyors, which approach each other, can be formed by sub-dividing the curbed assemblies into cordlike sections which can be aligned as desired. The radius may be adjusted to varying local conditions or the length of the curve by changing the number of sections and/or the size of the sections. The sections of any corner assembly may be equal in length or they may be unequal.

Various modifications and equivalent structures lend themselves to those skilled in the art. For example, the conveyor belt may be made of knit or woven fabric, or synthetic material or it may be made of a sheet or coherent slab or rubber, synthetic or natural material such as leather. As indicated the rollers may be covered with friction material. On the other hand, suitable resilient biasing means may be used to tension the rollers and the belt to provide the desired traction.

While not shown herein, it will be obvious that simple connecting means, similar to the plate 13 and bolt 15 are the only requirement to secure the shown sections to existing conveyor apparatus. The side wall extensions 12 may be made vertically adjustable by modifying the fasteners 12a.

It will thus be appreciated that the embodiment shown herein is illustrative only of the invention and should not be taken as limiting the scope thereof.

What is claimed:

1. In a belt conveyor an assembly comprising at least two similarly constructed sections, each section comprising a frame having a plurality of rollers journaled thereon to support the belt along a defined plane of transport, connecting means for adjustably fastening adjacent sections laterally to each other parallel to the plane of transport, a connecting roller located between adjacent sections below the plane of transport, means for adjustably mounting said connecting roller to pivot within a plane parallel to said plane of transport, said belt being trained over said supporting rollers and beneath said connecting rollers in a continuous path.

2. The assembly according to claim 1 wherein the supporting roller at one end of each section extends outwardly beyond the vertical edge of the frame and the roller at the opposite end of each section extends inwardly thereof, said adjacent sections being thereby adapted to dovetail with the extending roller of one section entering within the frame of the adjacent section.

3. The assembly according to claim 2 including auxiliary supporting rollers interposed between said first named supporting rollers.

4. The assembly according to claim 1 wherein the center of pivot of said roller is located in plane perpendicular to the plane of transport and bisecting the angle formed by medial axial planes of the facing guide rollers of adjacent sections.

5. The assembly according to claim 1 wherein the connecting roller between adjacent sections is mounted on a pivotal bracket pivotally secured to the connecting means of one of said adjacent sections to form a subassembly therewith.

6. The assembly according to claim 5 wherein said connecting means comprise a plate extending from each end of said frame, said plate lying in plane parallel to said plane of transport and being provided with a longitudinally directed slot, a bolt adapted to extend through said slots and secure adjacent plates, said bolt being further adapted to pivotally secure said connecting roller bracket to said plates.

7. The assembly according to claim 6 wherein said frame is formed of a pair of right angle brackets, said connecting plates being secured to the legs of said brackets to secure the same into a U-shaped channel.

8. The assembly according to claim 6 includes wall extensions secured to the upper arms of said right-angle brackets.

9. The assembly according to claim 1 wherein said sections are arranged in tandem, and adjusted to provide a defined radius of curvature, the connecting rollers being adjusted in accordance with the defined radius of curvature between adjacent sections to provide a continuously curved path for said conveyor belt thereabout.

10. The assembly according to claim 9 wherein the length of each section is predetermined by the radius of curvature, and the length of the path of curvature.

* * * * *